United States Patent [19]
Kemper et al.

[11] Patent Number: 5,705,133
[45] Date of Patent: *Jan. 6, 1998

[54] STATIONARY SCREEN EXTRACTOR

[75] Inventors: Timothy G. Kemper, Piqua, Ohio; Allan L. Monroe, Sidel, Ill.; Tony L. Ritter, Sidney, Ohio; Kenneth R. Frodge, Brookville, Ohio; Brian L. Patton, Dayton, Ohio

[73] Assignee: The French Oil Mill Machinery Co., Piqua, Ohio

[*] Notice: The term of this patent shall not extend beyond the expiration date of Pat. No. 5,591,416.

[21] Appl. No.: 598,238

[22] Filed: Feb. 7, 1996

Related U.S. Application Data

[63] Continuation-in-part of Ser. No. 372,496, Jan. 13, 1995, Pat. No. 5,591,416.

[51] Int. Cl.$^6$ ............................ B01D 11/02; B01D 12/00
[52] U.S. Cl. .................... 422/268; 422/269; 422/272; 422/273; 422/275; 384/121; 384/420; 384/590
[58] Field of Search ........................... 422/268, 269, 422/272, 273, 275; 384/121, 420, 590

[56] References Cited

U.S. PATENT DOCUMENTS

| | | | |
|---|---|---|---|
| 2,840,459 | 6/1958 | Karnofsky | 23/310 |
| 3,021,201 | 2/1962 | Upton | 23/272.5 |
| 3,062,626 | 11/1962 | Beck | 23/269 |
| 3,860,395 | 1/1975 | Kehse et al. | 23/269 |
| 4,125,379 | 11/1978 | Saxon | 422/269 |
| 4,307,064 | 12/1981 | Barger et al. | 422/267 |
| 4,376,052 | 3/1983 | Gessler | 210/511 |
| 4,390,506 | 6/1983 | Schumacher | 422/273 |
| 4,453,832 | 6/1984 | Schumacher et al. | 366/167 |
| 5,591,416 | 1/1997 | Kemper et al. | 422/268 |

Primary Examiner—Nina Bhat
Attorney, Agent, or Firm—Biebel & French

[57] ABSTRACT

An improved rotating basket extractor is provided having improved discharge means comprising a hopper section having a solid material entry and solid material exit end. The cross sectional area of the solid material entry end is smaller than the exit end so as to help prevent the agglomeration of solid material in the discharge hopper as it exits from the rotating baskets to a dual screw conveyor for subsequent travel to a discharge chute. The discharge hopper and the housing for the dual screw conveyor comprise slot means to provide for additional drainage of miscella therethrough. Additionally, the axially disposed rotatable shaft, supporting the rotating baskets, is journalled in upper and lower bearings located outside the outer housing member for ease of maintenance. The lower thrust bearing is mounted for direct support by the flooring substrate below the outer housing of the extractor to help minimize bearing contamination and corrosion. Power requirements are minimized through the combination of supporting the shaft by means of the single thrust bearing and driving the baskets by means of a bevel gear and pinion drive. Additional improvements help to prevent the solid material from obstructing miscella-carrying conduits.

19 Claims, 3 Drawing Sheets

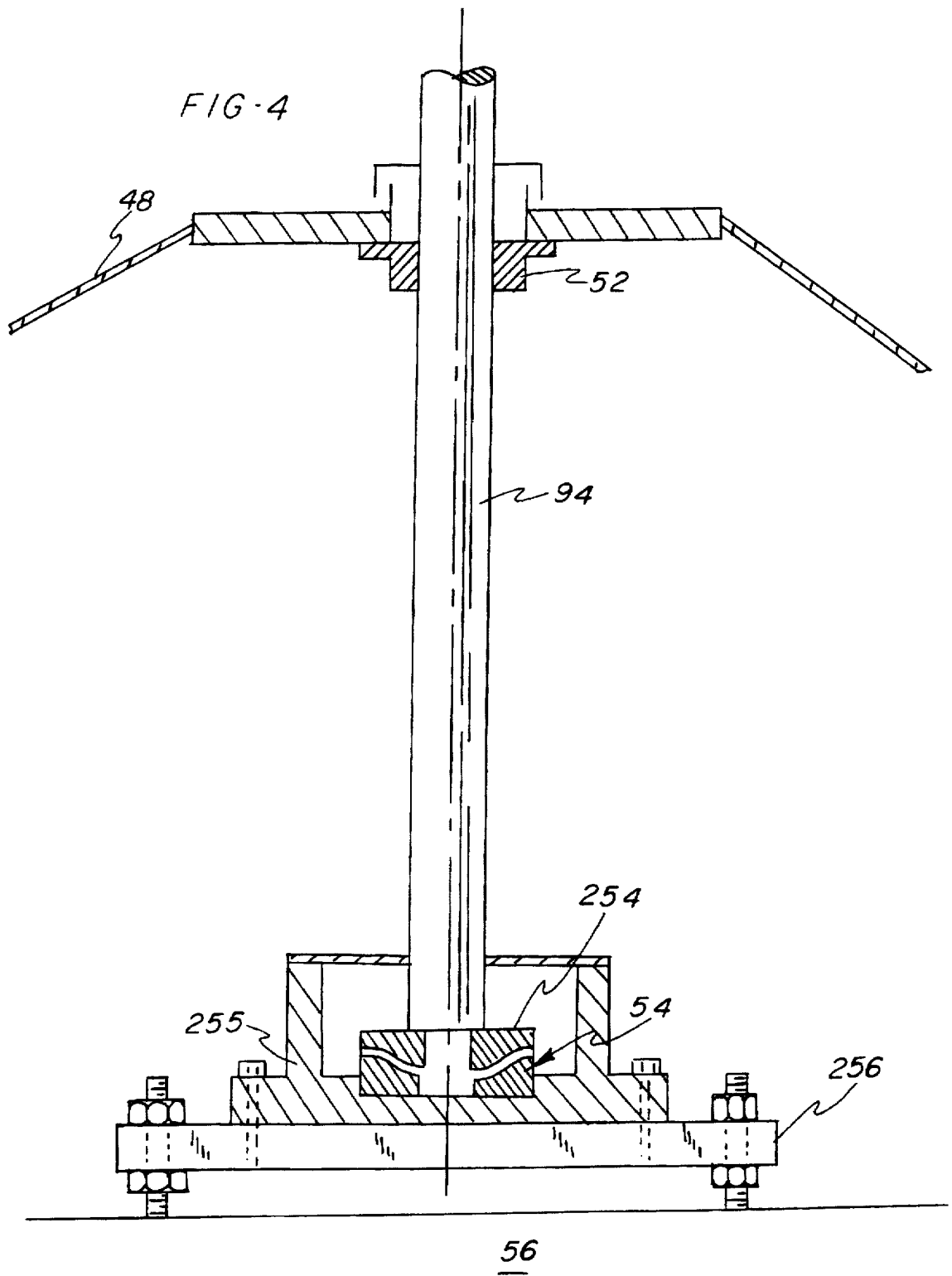

STATIONARY SCREEN EXTRACTOR

CROSS-REFERENCE TO RELATED APPLICATIONS

This application is a continuation-in-part of U.S. patent application Ser. No. 08/372,496, filed on Jan. 13, 1995 now U.S. Pat. No. 5,591,416.

BACKGROUND OF THE INVENTION

1. Field of the Invention

The present invention pertains to an improved stationary screen, rotatable basket extractor.

2. Description of the Related Art

It is well known in the art to extract a component such as an oil from a solid material by grinding the material to form grains or flakes and then passing a solvent through the granular material to separate the extractable component via solvent extraction. Commonly, the granular material is processed continuously. In one form of operation, the continuous flow of the granular material, such as soybeans, is fed into baskets near a feed station. The baskets move along a circular path from the feed station toward a discharge station, where the processed granular material is discharged. Miscella, or solvent which has passed at least once through the granular material, drains from the cells by gravity and collects in pans beneath the baskets for reuse or discharge.

In order to extract the desired component as completely as possible from the granular material, it is common to expose the granular material to solvent or miscella at multiple fluid feed stations along the circular path. For example, it is known to introduce the miscella into the baskets in a "counterflow" fashion such that the miscella is collected after it has percolated through the solid material. Pure solvent is introduced at the last fluid feed station along the circular path, while miscella drained from a cell at the first fluid feed station along the circular path is collected and discharged to an evaporator or the like to effect isolation of the extractable component.

Once the extraction process has been completed, the granular material must be collected and conveyed out of the system. It is common to discharge the granular material out of the baskets into a hopper at the end of the extraction process. Unfortunately, the granular material (which is still at least wet with the solvent) tends to stick to the sides of the hopper or to aggregate. As a result, the granular material often fails to flow smoothly to a screw or other conveyor at the bottom of the hopper. In some systems, agitators are provided to loosen the granular material so that it flows smoothly to the bottom of the hopper. Such agitators, which are typically motorized, add to the expense and maintenance requirements of the extractor.

Even after discharge of the solid material into the discharge hopper or the like, unrecovered miscella still exists therein.

Additionally, in those extraction systems in which the baskets are supported for rotation around a central, vertically disposed axial shaft, it has been found that the placement of the axial support bearings which support the axial shaft has a significant impact on the performance of the extractor. Axial support bearings that are located in or adjacent to miscella drainage reservoirs or to the granular material carrying cells are susceptible to contamination, so that the extraction units must be shut down periodically for cleaning. Furthermore, axial support bearings located within the housing of the extractor are difficult to maintain and cannot be reached without substantial disassembly of the extractor housing.

Accordingly, there remains a need in the art for the provision of an extractor having a discharge unit constructed in such manner as to minimize the tendency of the discharged solid material to agglomerate at the discharge area or along discharge chute walls and the like. There is an even more specific need to provide a discharge device that provides for improved miscella removal.

Additionally, in those structures in which rotatable baskets are structured for rotation about a centrally disposed axial shaft, there is a need to provide a thrust bearing to journal the shaft, which bearing is located remote from the miscella collection receiver and the grain carrying cells so as to minimize the possibility of bearing contamination.

Yet another drawback to counterflow extractors is the potential for the granular material to obstruct miscella-carrying conduits. One cause for such obstruction is contact between the miscella feeds and granular material at the tops of the baskets as the cells move through the multiple feed stations. Another cause of such obstruction is the escape of granular material discharging toward the hopper into the miscella drainage reservoirs. Accordingly, there remains a need in the art for rotary extractors including structure for separating the granular material from the miscella-carrying conduits.

SUMMARY OF THE INVENTION

These and other objects are met by the improved stationary screen extractor disclosed herein.

Briefly, the invention comprises improvement in rotary basket type extractor units. It includes a continuous, flat fixed slotted bottom positioned under the rotating baskets. The axial shaft around which the baskets rotate is supported by a single central lower thrust bearing to support the weight of both the material processed and the rotatable structure. This combination provides improved reliability by decreasing the power required to rotate the cells as compared with prior art extractors. Furthermore, the combination results in decreased wear and easier maintenance in comparison to prior art extractors, thereby reducing downtime.

The power requirements are further reduced through the use of a bevel gear and pinion drive to rotate the baskets. In an especially preferred form, a door is provided adjacent the pinion for ease of maintenance of the bevel gear.

In contrast to prior art structures, the lower thrust bearing, as well as a central upper bearing which stabilizes the axial shaft in an upright position, are preferably located outside the extractor housing for ease of maintenance. The lower thrust bearing is located either at floor level or on a support structure below the miscella collection pans rather than at the inner edge of the grain containing cone as set forth in prior art U.S. Pat. No. 3,062,626. This, in turn, allows a mechanical seal to be positioned at the inner edge of the miscella collection pan to prevent solvent leaks and bearing contamination. In a preferred form, the thrust bearing is supported either directly by the floor or on a pedestal which is directly supported by the floor to help reduce vertical deflection of the rotating basket assembly. This reduction in vertical deflection will prevent uneven rack and pinion alignment and subsequent vibration and wear.

Additional improvement resides in the solids discharge means and associated conveyor means, which, together, allow for discharge of the granular material without excessive accumulation thereof at the discharge entry. This is accomplished by provision of a housed discharge structure which, in cross sectional area, is smaller at the entry end with diverging wall members defining a larger cross sectional area at the downstream or exit section of the discharge unit. Additionally, slots are provided in at least one of the vertically inclined walls of the discharge unit so as to allow for the horizontal flow or drainage of retained miscella from the solids discharge area into a miscella collection conduit or the like.

Still further, after the material has been discharged from the rotating baskets and has traveled through the above described discharge unit, it is gravity fed to a dual screw conveyor means adapted to shear and convey the solid material to a discharge chute. One of the screws is provided with right hand threads with the other screw having left hand threads. The screws are rotated in opposite directions and accordingly, in addition to conveying the solid material to the discharge chute, they provide a kneading or shearing action to the material, thereby liberating additional miscella. The dual screws are mounted in a housing which housing comprises at least one horizontal slotted wall member so as to provide an additional site for miscella drainage from the extractor unit.

The invention will be further described in conjunction with the appended drawings and following detailed description.

BRIEF DESCRIPTION OF THE DRAWINGS

FIG. 4 is a sectional view of the central thrust bearing taken along the plane 4—4 as shown by the line and arrows 4—4 of FIG. 1.

DETAILED DESCRIPTION OF THE PREFERRED EMBODIMENT

Figure 1:
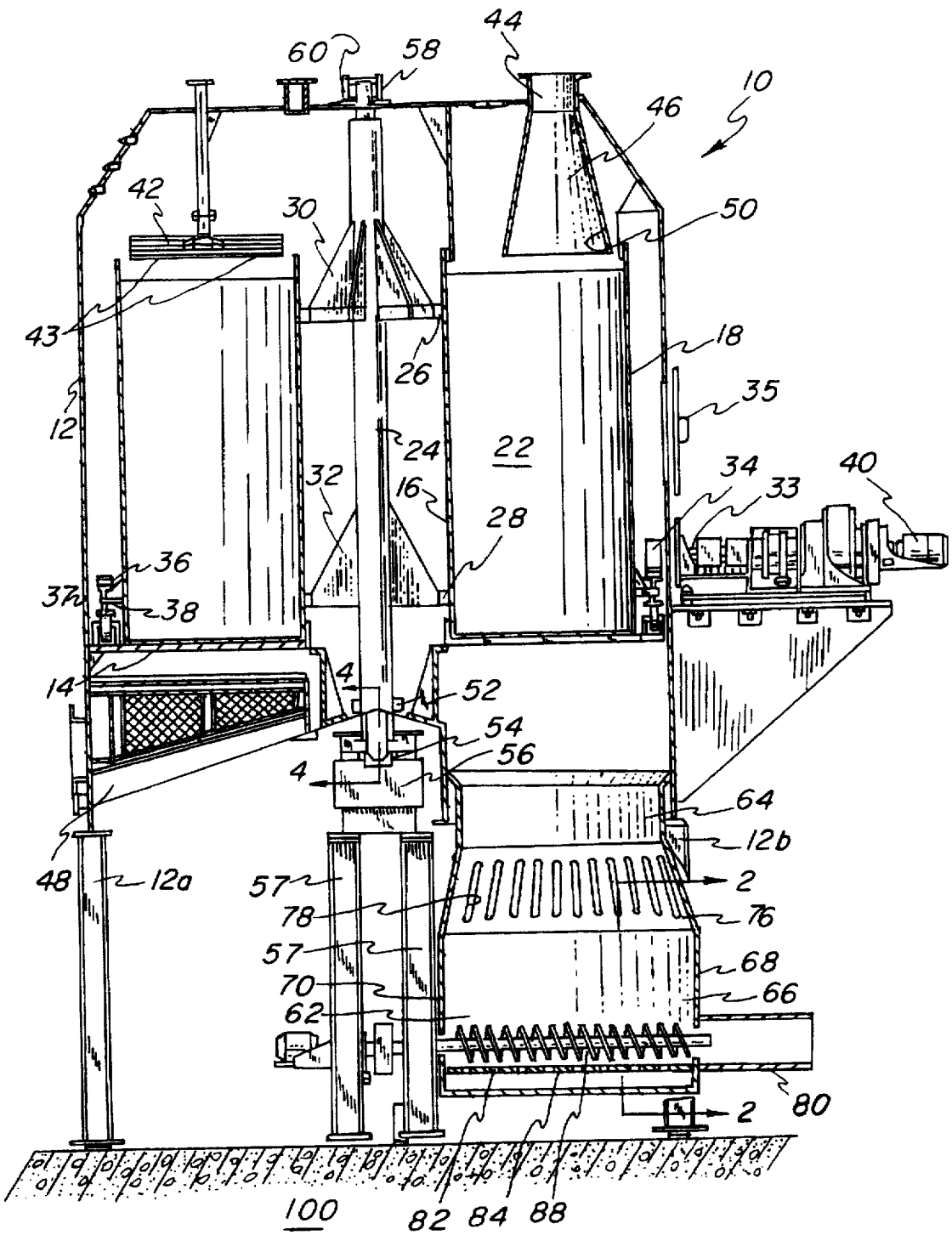
FIG. 1 is a vertical sectional view of an improved extractor in accordance with the invention.

Turning now to FIG. 1, there is shown extractor 10 comprising outer housing member 12 fixedly supported on a flooring via supports 12a and 12b (only two shown). The extractor is of the type having a plurality of baskets provided for rotational movement around a central axis. The baskets receive liquid solvent such as hexane and/or miscella and discharge the miscella through a screen or the like. Upon completion of rotational travel around the central axis, the basket dumps the solid extractable material into a discharge device or the like. Devices of this general type are disclosed in U.S. Pat. Nos. 2,840,459 (Karnofsky) and 3,860,395 (Kense et al.), the entire disclosures of which are hereby incorporated by reference.

With further regard to FIG. 1 of the drawings, stationary, fluid permeable screen 14 is shown disposed under the bottom of the baskets. Screen 14 comprises a multiplicity of slot members (not shown) through which miscella passes to miscella collection pan 48. The slots are about 0.080 inches (2.0 millimeters) in width and extend circumferentially around the vertically disposed axial shaft.

The baskets 22 are defined by a rotor comprising inner and outer annular walls 16, 18, respectively. It is noted that for each basket forward and trailing radially extending walls (not shown) are provided so as to constitute a perimeter or housing for the basket.

The baskets are mounted for rotation around axial shaft 24 by the provision of support brackets 26, 28 received within cross brace members 30, 32 respectively. The cells are rotated by means of a bevel pinion and gear type drive comprising bevel pinion 34 driven via motor 40. Pinion 34 engages bevel gear 36 which is fixedly secured to rail member 38 which in turn is coupled to the wall 18 so as to impart rotation to the cells.

As shown best in FIG. 5, guide rollers 37 are distributed annularly along an inner surface of the outer housing member 12 adjacent the screen 14 to restrain the cells 22 from pitching and to provide yieldable, rolling support for the cells as they rotate. An annular plate 39 fixed to an inner surface of the outer housing member 12 supports both the screen 14 and a plurality of clevises 41 which position the guide rollers 37 beneath the rail 38. During operation, the guide rollers 37 touch the underside of the rail 38 to help prevent axial pitching of the cells 22 during their rotation. In case of a failure of the lower thrust bearing 54, however, these guide rollers 37 also serve to minimize damage to the machine and risk to operators. When the extractor is to be serviced, a small wedge or shim may be placed intermediate the rollers 37 and the plate 39 to provide further load bearing support.

Turning back to FIG. 1, the motor 40 is positioned outside the outer housing member 12, and includes a drive shaft 33 which projects through the outer housing member 12 and mounts the bevel pinion 36. A door 35 is provided adjacent the motor 40 and the pinion gear 36 to provide access to the bevel gear segments 36, near the motor 40 for maintenance. The door 35 is mounted to the outer housing member 12 by means of threaded fasteners (not shown) for ease of removal.

Liquid solvent, such as hexane or miscella, is fed to the baskets by a series of liquid material feeds or feed conduits, one of which is shown at reference numeral 42. The liquid material feeds 42 each define one or more liquid material feed ports 43 in a conventional manner. Extractable granular solid material is fed to the cells via a solid material feed or conduit 44, via action of an auger (not shown) disposed thereabove. The solid material feed 44 includes a diverging vertical hood 46 which defines a solid material feed port 50 at the lower end thereof through which granular material falls into the baskets 22 by gravity. This hood 46 extends slightly closer to an upper plane of the baskets 22 than does the liquid material feeds 42, so that the solid material feed port 50 is lower than the liquid material feeds 42.

In operation, solid oil-bearing material falls through the hood 46 and the solid material feed port 50 of the solid material feed 44 into a basket 22 positioned below the solid material feed 44. In doing so, the solid material is fed to the basket 22 from the level of solid material feed port 50. This limits the height of the solid material in the basket 22 to a height no greater than approximately that of the solid material feed port 50 over the basket 22. Meanwhile, the motor 40 drives the bevel pinion 34 and the bevel gear 36 to turn the rotor 16, 18, thereby shifting the basket 22 formerly beneath the solid material feed 44 to a station beneath one of the liquid material feeds 42. Since the liquid material feed ports 43 are higher than the solid material feed port 50 is over the basket 22, the liquid material feed 42 does not contact the solid material in the basket 22. The solvent or miscella passes through the solid material in the basket 22 and through the screen 14 to be collected in the miscella collection pans 48. Meanwhile, the motor 40 continues to drive the rotor 16, 18, thereby shifting the basket 22 to a discharge station where the solid material is discharged.

Seal member 52 surrounds axial shaft 24 at the location of miscella collection pan 48. Lower thrust bearing 54 is disposed underneath this seal.

Lower thrust bearing 54 is supported by a pedestal member 56 having leg members 57 anchored to the floor or substrate 100 in a location that is remote from the miscella collection pan 48 and the cells 22. This is a distinct improvement over prior art devices in that this seal member 52 will not become contaminated with miscella or with the granular material as often occurred when the central thrust bearing for the rotating basket rotor was located either in or closely spaced from the miscella collection conduit or pan, or close to the grain containing cells. Also, anchoring the bearing, or the bearing-supporting pedestal, to the floor rather than on a support truss reduces vertical deflection of the rotor, which prevents uneven bevel gear and bevel pinion alignment and subsequent vibration and wear.

An upper bearing 58 located above the miscella collection pans 54, the baskets 22, and the material feeds 42, 44 provides radial stabilization for the shaft 24 as the baskets 22 rotate. This upper bearing 58, which is preferably a spherical roller bearing, is located in a bearing cover 60, mounted on an upper external portion of the outer housing member 12. The bearing cover 60 is preferably secured to the upper external portion of the outer housing member 12 by means of threaded fasteners (not shown) which may be readily removed for access to the upper bearing 58. Since the upper and lower bearings 54, 58 are located outside the outer housing member 12, they may be reached for maintenance without disassembly of the outer housing unit 12.

Discharge hopper 62 is provided in communication with an opening (not shown) in the stationary fluid permeable screen 14 disposed underneath the rotating baskets 22. As shown in FIG. 1, an entry section 64 of the hopper is provided directly under this opening with an exit section 66 of the hopper disposed downwardly from entry section 64. Vertically extending hopper walls 68, 70, are spaced from each other and diverge as they extend downwardly toward exit section 66 of the hopper.

Accordingly, the cross sectional area of the hopper and entry section 64 is less than that presented in exit section 66 of the hopper. This helps to prevent "bridging" and excessive agglomeration of the discharged granular material that occurs with some of the prior art discharge devices.

Again, as can be seen in FIG. 1, hopper side wall 74 is provided with slots 78 therein. These slots 78 provide drainage sites therein for horizontal flow of miscella with the slots draining into a collection trough or the like (not shown).

Figure 2:
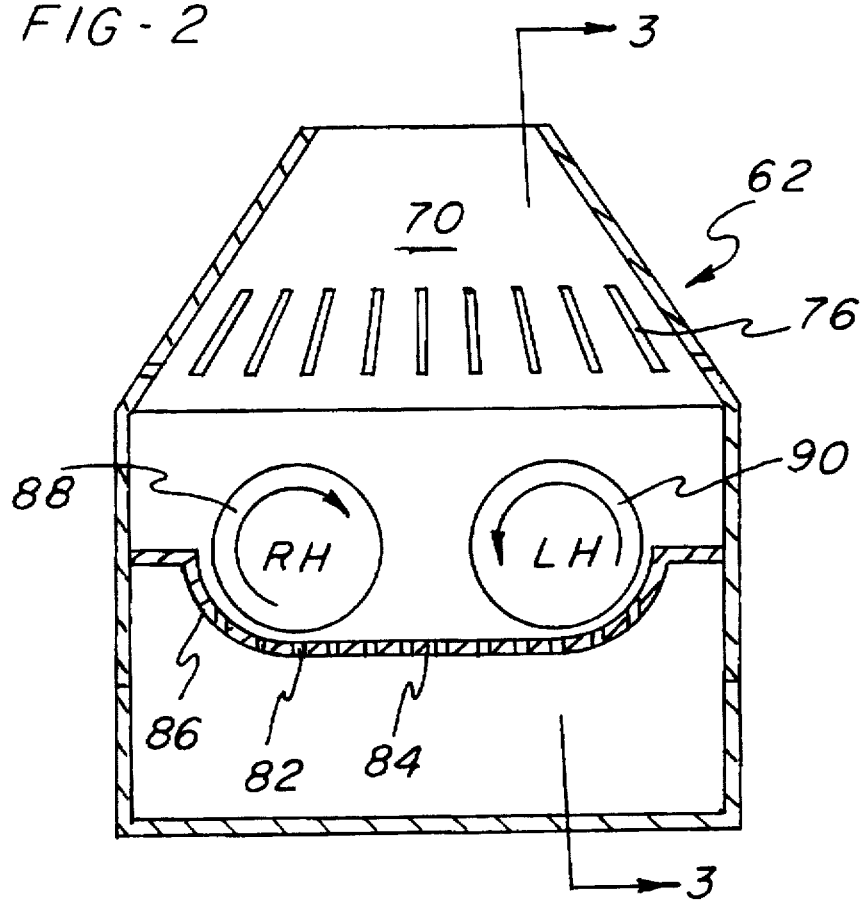
FIG. 2 is a sectional view of the solids discharge hopper taken along the plane 2—2 as shown by the line and arrows of FIG. 1.

After travel of the solid extractable material through the entry and exit sections 64, 66 respectively of discharge hopper 62, the material is worked and forwarded to discharge chute 80 of the extractor by a dual screw conveyor. As best shown in FIGS. 1 and 2, slots 82 (FIG. 2) are provided in the bottom wall 84 of the housing 86 surrounding the screws 88, 90 (only one shown in FIG. 1) to provide additional drainage of miscella.

Turning now to FIG. 2, there is shown a portion of the discharge hopper and associated screw conveyor. Here, wall 70 comprises slot members 78 as previously described. At the bottom end of the hopper, a screw conveyor means is provided comprising dual screws. Screws 88 and 90 are shown in cross-section. Screw 88 is provided with right hand extending screw flights (right hand pitch) and screw 90 is provided with left hand extending screw flights (left hand pitch). These screws are rotated in opposite rotational directions to therefore mechanically knead or work the solid extractable material and to ultimately advance same to discharge chute 80 (FIG. 1).

Figure 3:
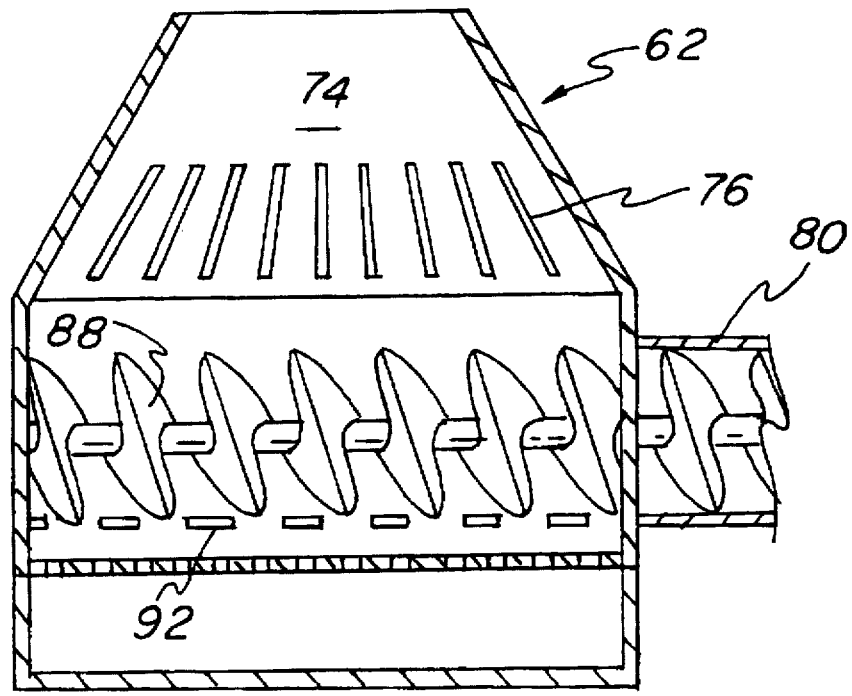
FIG. 3 is a sectional view of the solids discharge hopper taken along the plane 3—3 as shown by the line and arrows of FIG. 2.

Additionally, as can be seen in FIG. 3, slots 78 are provided in rear, radially extending wall 74 of the hopper 62. (The leading or front radial wall of the hopper is not shown). Slots 92 are also provided in the rear radially extending wall section proximate the dual screw conveyor. Again, these slots provide for drainage of miscella into suitable collection devices (not shown).

Turning now to FIG. 4, there is shown the single, centrally located lower thrust bearing 54 located on the pedestal member 56. The bearing 54 comprises a spherical roller thrust bearing 254 mounted in a bearing pot 255 which is located on an adjustable base plate 256.

While the forms of apparatus herein described constitute preferred embodiments of the invention, it should be understood that the invention is not limited to these precise forms of apparatus, and that changes may be made therein without departing from the scope of the invention, which is defined in the appended claims.

What is claimed is:

1. An extractor comprising:
    a housing supported by a substrate;
    a rotor defining baskets at least partially enclosed by the housing;
    a vertical shaft at least partially enclosed by the housing and fixed to the rotor for restraining the baskets in a rotational path of travel;
    and a lower thrust bearing mounted below the housing and in engagement with the vertical shaft such that the lower thrust bearing supports substantially the entire weight of the vertical shaft and the rotor.

2. The extractor as recited in claim 1 wherein the lower thrust bearing is anchored to the substrate such that substantially the entire weight of the vertical shaft and the rotor is transferred by the lower thrust bearing to the substrate.

3. The extractor as recited in claim 1 including an upper bearing in engagement with the vertical shaft such that the lower thrust bearing and the upper bearing are each positioned outside the housing.

4. The extractor as recited in claim 3 including an upper bearing cover mounted on an upper external portion of the housing so as to enclose the upper bearing.

5. The extractor as recited in claim 1 including a pedestal anchored to the substrate below the housing for supporting the lower thrust bearing.

6. The extractor as recited in claim 1 including a solid material feed for supplying solid material to the cells and a liquid material feed for supplying miscella to the cells, wherein the solid material feed extends closer to the cells than the liquid material feed.

7. The extractor as recited in claim 6 wherein the solid material feed includes a vertical hood defining a solid material feed port positioned above the cells and the liquid material feed defines a liquid material feed port positioned above the cells such that the solid material feed port is positioned below the liquid material feed ports.

8. The extractor as recited in claim 1 including a bevel gear coupled to the rotor, a bevel pinion in meshing engagement with the bevel gear and a motor having a rotatable shaft coupled to the bevel pinion for driving the baskets along the rotational path of travel.

9. The extractor as recited in claim 8 including an opening in the housing near the motor for access to the bevel pinion and bevel gear segments.

10. An extractor comprising:
    structure defining baskets;
    a support restraining the baskets to move in a path of travel;

a solid material feed aligned with the path of travel for feeding a solid material to the baskets;

a screen under the baskets for supporting the solid material in the baskets; and a liquid material feed aligned with the path of travel for feeding a liquid material to the baskets;

wherein the solid material feed extends closer to the baskets than the liquid material feed.

11. The extractor as recited in claim 10 wherein the solid material feed defines a vertical outlet section ending in a solid material feed port such that the solid material passes through the solid material feed port and into the baskets by gravity.

12. The extractor as recited in claim 10 wherein the solid material feed includes a vertical hood defining a solid material feed port positioned above the baskets and the liquid material feed defines a liquid material feed ports positioned above the baskets such that the solid material feed port is positioned below the liquid material feed ports.

13. An extractor comprising:

a housing;

a rotor defining baskets at least partially enclosed by the housing;

a vertical shaft at least partially enclosed by the housing and fixed to the rotor for restraining the baskets in a rotational path of travel;

a screen under the rotor for supporting solid material in the baskets;

a motor mounted on an exterior of the housing including a drive shaft projecting into an interior of the housing for driving the rotor; and a door in the housing adjacent the drive shaft.

14. The extractor as recited in claim 13 including a bevel gear coupled to the rotor and a bevel pinion coupled to the shaft in meshing engagement with the drive shaft, wherein the door is adjacent to the bevel pinion.

15. The extractor as recited in claim 14 including a plurality of rollers supported by the housing and distributed annularly beneath the bevel gear support.

16. The extractor as recited in claim 13 including a lower thrust bearing positioned below the housing in engagement with the vertical shaft and a seal mounted on the housing and embracing the shaft above the lower thrust bearing.

17. An extractor comprising:

a rotor defining baskets at least partially enclosed by the housing;

a vertical shaft at least partially enclosed by the housing and fixed to the rotor for restraining the baskets in a rotational path of travel;

a lower thrust beating supporting the vertical shaft;

a screen under the rotor for supporting solid material in the cells;

a bevel gear coupled to the rotor and a bevel gear support attached to said rotor;

a bevel pinion in meshing engagement with the bevel gear;

a motor having a drive shaft mounting the bevel pinion; and a plurality of rollers distributed annularly below the bevel gear support.

18. The extractor as recited in claim 17 herein the lower thrust bearing and the plurality of rollers are so constructed and arranged that the lower thrust bearing supports substantially the entire weight of the vertical shaft and the rotor.

19. The extractor as recited in claim 17 including a housing enclosing the rotor such that the motor is positioned on an exterior of the housing, wherein the housing includes a door adjacent the bevel pinion.

* * * * *